US012625571B2

(12) United States Patent
Hung et al.

(10) Patent No.: US 12,625,571 B2
(45) Date of Patent: May 12, 2026

(54) CONTENT EVALUATION SYSTEM, METHOD, AND PROGRAM

(71) Applicant: Wacom Co., Ltd., Saitama (JP)

(72) Inventors: Ipei Hung, Saitama (JP); Peter Bacher, Portland, OR (US); Jin-fu Ko, Saitama (JP); Nobutaka Ide, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/888,674

(22) Filed: Sep. 18, 2024

(65) Prior Publication Data

US 2025/0013322 A1     Jan. 9, 2025

Related U.S. Application Data

(63) Continuation of application No. PCT/JP2022/020335, filed on May 16, 2022.

(60) Provisional application No. 63/330,681, filed on Apr. 13, 2022.

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
CPC ... G06F 3/03545; G06F 3/038; G06F 3/04883
See application file for complete search history.

(56) References Cited

U.S. PATENT DOCUMENTS 11,574,552 B2 *  2/2023  Won ........................ G09B 7/07
2013/0257777 A1 * 10/2013  Benko .................. G06F 3/0383
                                                                   345/173

(Continued)

FOREIGN PATENT DOCUMENTS

JP           6717387 B2      7/2020
WO    WO 2018168784 A1     9/2018

OTHER PUBLICATIONS

International Search Report dated Jul. 19, 2022, for the corresponding International Patent Application No. PCT/JP2022/020335, 4 pages. (With English Translation).

*Primary Examiner* — Bryan Earles
(74) *Attorney, Agent, or Firm* — Seed Intellectual Property Law Group LLP

(57) ABSTRACT
Provided is a content evaluation system including an electronic pen, a data generation section that generates content data from writing operations performed by the electronic pen, a data acquisition section that acquires the content data, a first calculation section that calculates, from the acquired content data, a plurality of kinds of time-series feature amounts indicating a temporal change in a plurality of kinds of feature amounts related to a creation process of the handwritten content, a second calculation section that calculates an integrated feature amount related to the creation process of the handwritten content by using two or more kinds of time-series feature amounts from among the plurality of kinds of time-series feature amounts, and a content evaluation section that evaluates the handwritten content in reference to the integrated feature amount and outputs evaluation result information indicating the evaluation result of the handwritten content.

11 Claims, 13 Drawing Sheets

(56) References Cited

U.S. PATENT DOCUMENTS

2021/0132709 A1 * 5/2021 Tatani .................... B43K 29/08
2022/0415205 A1 * 12/2022 Won ................... G06V 30/1801

* cited by examiner

```
{
    "documentMetadata":......,
    "inksemantics":,
    "devices":............,
    "strokes":......................,
    "groups":,
    "contexts":............,
}
```

68

```
<traceGroup xml:id="g0">
    <trace> 15 14, ---------------, 21 12 </trace>   : stroke #01
    <trace> 20 13, ---------------, 22 25 </trace>   : stroke #02
    <trace> 28 10, ---------------, 28 23 </trace>   : stroke #03
    <trace> 36 10, ---------------, 42 14 </trace>   : stroke #04
    <trace> 41 19, ---------------, 42 21 </trace>   : stroke #05
    <trace> 52 14, ---------------, 47 20 </trace>   : stroke #06
    <trace> 58  5, ---------------, 61  7 </trace>   : stroke #07
    <trace> 62 11, ---------------, 63 16 </trace>   : stroke #08
    <trace> 72  9, ---------------, 68 15 </trace>   : stroke #09
    <trace> 20 47, ---------------, 23 50 </trace>   : stroke #10
    . . . .
</traceGroup>
```

F I G . 8

INPUT/OUTPUT ERROR
(MOTIVATION FEATURE AMOUNT)

100

F I G . 1 2
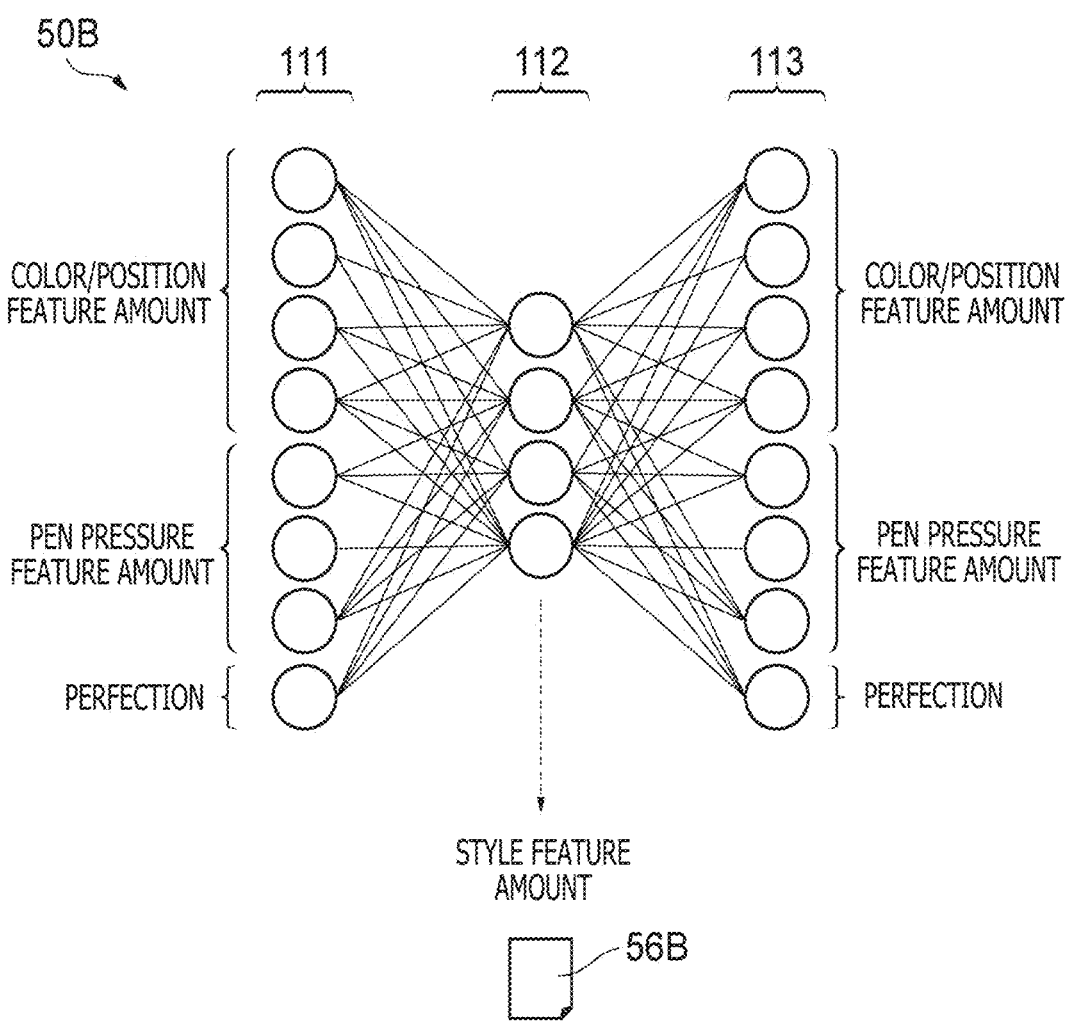

CONTENT EVALUATION SYSTEM, METHOD, AND PROGRAM

BACKGROUND

Technical Field

The present disclosure relates to a content evaluation system, a content evaluation method, and a content evaluation program. More particularly, the present disclosure relates to a content evaluation method, a content evaluation method, and a content evaluation program that collects data from the handwritten content performed by the user through an electronic pen, and then calculates and outputs from the evaluation result discerned characteristics of the creation process of the handwritten content.

Description of the Related Art

There is known a technique for evaluating handwritten content which makes it possible to, for example, automatically score an answer to an open-ended question. An example of this type of evaluation is disclosed in Japanese Patent No. 6717387, which comprises a sentence evaluation device that acquires a first logical relation established between first events configuring a first sentence, extracts a second logical relation established between second events configuring a second sentence from the second sentence to be evaluated, and evaluates the second sentence by comparing the first logical relation with the second logical relation.

However, while academic ability can be evaluated by calculating a score or a percentage of correct answers by evaluating the completed answer, other factors related to the creation and execution of the answer cannot be evaluated, such as the learning motivation of the user throughout the creation of the answer.

BRIEF SUMMARY

The present disclosure has been made in view of the above circumstances to provide a content evaluation system, a content evaluation method, and a content evaluation program capable of evaluating more characteristics throughout the completion of the handwritten content rather than simply the finished product.

According to a first aspect of the present disclosure, there is provided a content evaluation system including an electronic pen and a data generation section that takes the writing operations performed by the user through the electronic pen and generates content data corresponding to the handwritten content. A data acquisition section then acquires the content data and a first calculation section calculates from the content data a plurality of kinds of time-series feature amounts indicating a temporal change in a plurality of kinds of feature amounts related to the writing operations that constitute the handwritten content. A second calculation section then calculates an integrated feature amount related to the writing operations by using two or more kinds of time-series feature amounts from among the plurality of kinds of time-series feature amounts calculated by the first calculation section. A content evaluation section evaluates the handwritten content in reference to the integrated feature amount calculated by the second calculation section and outputs evaluation result information about the handwritten content.

According to a second aspect of the present disclosure, one or more computers execute an acquisition step of acquiring content data corresponding to the handwritten content. A first calculation uses the content data to calculate a plurality of kinds of time-series feature amounts indicating a temporal change in a plurality of kinds of feature amounts related to the writing operations, and a second calculation step calculates an integrated feature amount related to the writing operations by using two or more kinds of time-series feature amounts from among the plurality of kinds of calculated time-series feature amounts. An evaluation step evaluates the handwritten content in reference to the calculated integrated feature amount and outputs evaluation result information indicating the evaluation result about the handwritten content.

According to a third aspect of the present disclosure, there is also provided a content evaluation program where one or more computers execute an acquisition step of acquiring content data corresponding to the handwritten content. A first calculation step calculates, from the content data, a plurality of kinds of time-series feature amounts indicating a temporal change in a plurality of kinds of feature amounts related to the writing operations, and a second calculation step of calculates an integrated feature amount related to the writing operations by using two or more kinds of time-series feature amounts from among the plurality of kinds of calculated time-series feature amounts. An evaluation step evaluates the handwritten content in reference to the calculated integrated feature amount and outputs evaluation result information indicating the evaluation result of the handwritten content.

BRIEF DESCRIPTION OF THE SEVERAL VIEWS OF THE DRAWINGS

FIG. 5 is a diagram illustrating an example of a data structure of content data included in evaluation data;

FIG. 8 is a diagram illustrating an example of a method for determining learning motivation;

FIG. 12 is a diagram illustrating a second example of a network structure of the learning unit.

DETAILED DESCRIPTION

Embodiments of the present disclosure will now be described in detail with reference to the accompanying drawings.

Configuration of Content Evaluation System 10

Entire Configuration

Figure 1:
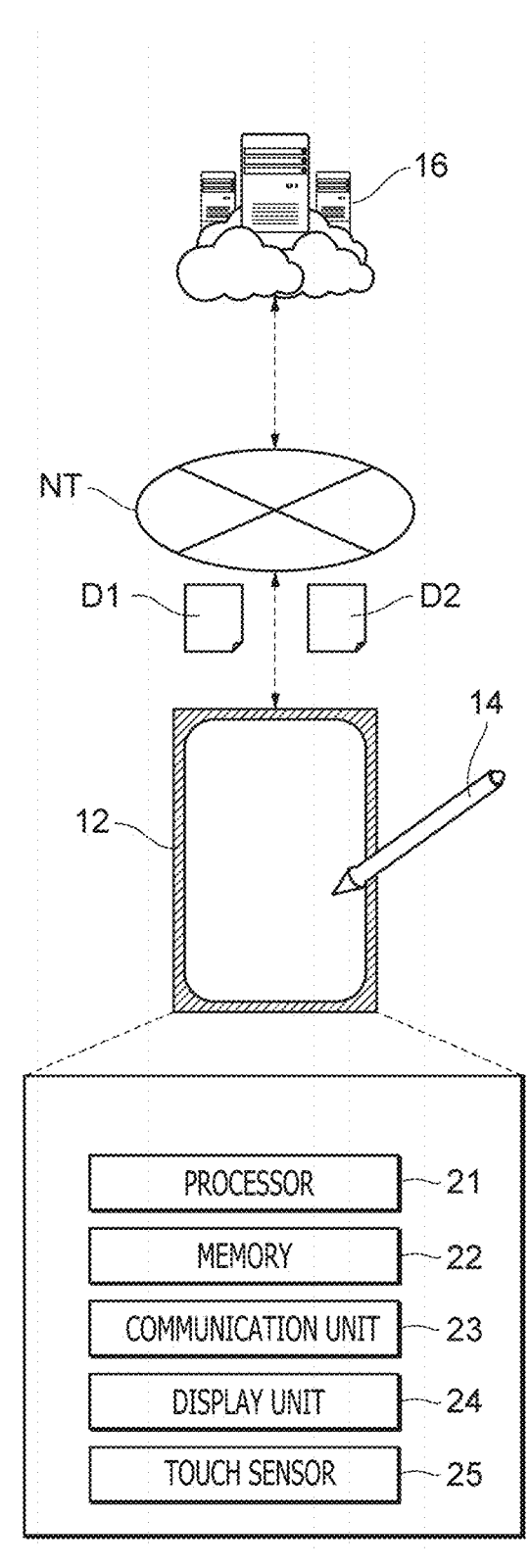
FIG. 1 is a diagram illustrating the content evaluation system according to an embodiment of the present disclosure.

FIG. 1 is a diagram illustrating the content evaluation system according to an embodiment of the present disclosure. The content evaluation system 10 is provides a "content evaluation service" for evaluating the creation process of a handwritten content, such as an answer to an open-ended question or a drawn artwork, and reporting the evaluation to the user. Specifically, the content evaluation system 10 includes one or more user devices 12, one or more electronic pens 14, and a server device 16.

The user device 12 is a computer configured with, for example, a tablet, a smartphone, a personal computer, or other computer with a touch surface. The user device 12 is configured such that various kinds of data including evaluation data D1 and display data D2 can be exchanged with the server device 16 via a network NT.

Specifically, the user device 12 includes a processor 21, corresponding to a "data generation section", a memory 22, a communication unit 23, a display unit 24, corresponding to a "display section," and a touch sensor 25. The processor 21 is configured with an operation processing device including a central processing unit (CPU), a graphics processing unit (GPU), and a micro-processing unit (MPU). The processor 21 reads a program and data stored in the memory 22 to generate digital ink by receiving writing operations from the electronic pen 14 and displays the writing operations to create the handwritten content. The memory 22 stores programs and data necessary for the processor 21 to control each constitutional element and includes a non-transient and computer-readable storage medium. Here, the computer-readable storage medium includes a storage device which may be a hard disk drive (HDD) and a solid state drive (SSD) incorporated in a computer system, a portable medium such as a magneto-optical disk, a read only memory (ROM), a compact disc (CD)-ROM, and a flash memory, or other storage device.

The communication unit 23 performs wired or wireless communication with an external device which allows the user device 12 to exchange various kinds of data, including the evaluation data D1 or the display data D2 with, for example, the server device 16.

The display unit 24 displays content including an image or a video, and may include, for example, a liquid crystal panel, an organic electro-luminescence (EL) panel, or electronic paper. It should be noted that the display unit 24 being configured to be flexible enables the user write while the touch surface of the user device 12 is curved or bent.

The touch sensor 25 is a capacitance sensor in which a plurality of sensor electrodes is arranged in a plane shape. The touch sensor 25 includes, for example, a plurality of X-line electrodes for detecting the position of the X-axis in the sensor coordinate system and a plurality of Y-line electrodes for detecting the position of the Y-axis. It should be noted that the touch sensor 25 may be a self-capacitive sensor in which block-shaped electrodes are arranged in a two-dimensional grid.

The electronic pen 14 is a pen-type pointing device and is configured to be capable of communicating with the user device 12 in one direction or bidirectionally. The electronic pen 14 may be an active capacitive coupling (AES) or electromagnetic induction (EMR) stylus. A user can solve an equation or draw a picture on the user device 12 by gripping the electronic pen 14 and moving it while pressing the pen tip against the touch surface of the user device 12.

The server device 16 is a computer that performs integrated control related to evaluation of the handwritten content and may either be of a cloud type or an on-premises type. Here, although the server device 16 is illustrated as a single computer, the server device 16 may instead be a group of computers for constructing a distributed system.

Block Diagram of Server Device 16

Figure 2:
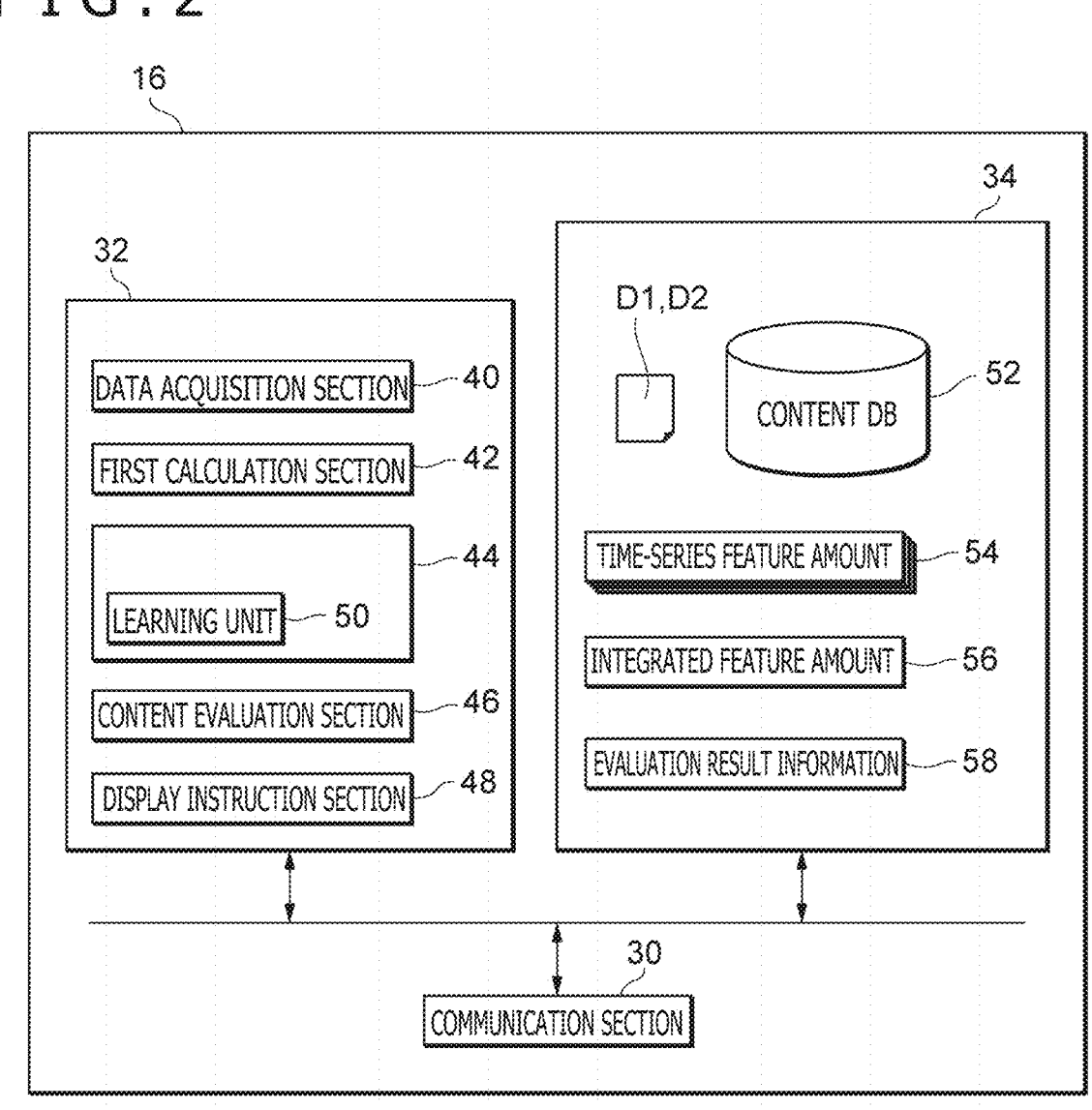
FIG. 2 is a block diagram illustrating an example of an embodiment of a server device depicted in FIG. 1.

FIG. 2 is a block diagram illustrating an example of an embodiment of a server device depicted in FIG. 1. Specifically, the server device 16 includes a communication section 30, a control section 32, and a storage section 34.

The communication section 30 is an interface for transmitting and receiving electrical signals to and from an external device. Accordingly, the server device 16 can acquire the evaluation data D1 from the user device 12 and transmit the display data D2 generated by itself to the user device 12.

The control section 32 is configured with one or more processors, which may be a CPU, GPU, or other processor. The control section 32 reads and executes the program and the data stored in the storage section 34, thereby functioning through a data acquisition section 40, a first calculation section 42, a second calculation section 44, a content evaluation section 46, and a display instruction section 48.

The data acquisition section 40 acquires various kinds of data (hereinafter, referred to as the "evaluation data D1") related to the handwritten content to be evaluated. The data acquisition section 40 may acquire the evaluation data D1 from an external device via communication or by reading it from the storage section 34. The acquisition timing may be after the handwritten content is completed or during the creation of the handwritten content. In the latter case, the data acquisition section 40 automatically acquires the evaluation data D1 upon accepting an explicit instruction, such as tapping a button, or from an implicit instruction, such as performing a brush stroke, by a user.

The first calculation section 42 calculates each time-series feature amount 54 indicating a temporal change in a plurality of kinds of feature amounts related to the creation of the handwritten content from the evaluation data D1 acquired by the data acquisition section 40. At the time of the calculation, a "removal process" for removing unnecessary data for the calculation of the time-series feature amount 54, an "association process" for associating each feature amount with time, a "truncation process" for truncating a blank time if necessary, a "normalization process" for normalizing the feature amount and time, or other similar processes is executed.

For example, in the case where the handwritten content is an answer 60 (FIG. 4) to a given problem, the two or more kinds of time-series feature amounts 54 include a first time-series feature amount indicating a temporal change in the moving speed of the electronic pen 14 corresponding to the stroke and a second time-series feature amount indicating a temporal change in the pen pressure of the electronic pen 14 corresponding to the stroke. In addition, in the case where the handwritten content is an artwork 100 (FIG. 11), the two or more kinds of time-series feature amounts 54 include a first time-series feature amount indicating a temporal change in the position of the electronic pen 14 corresponding to the stroke and a second time-series feature amount indicating a temporal change in the pen pressure of the electronic pen 14 corresponding to the stroke.

The second calculation section 44 calculates an integrated feature amount 56 related to the creation process of the handwritten content by using two or more kinds of time-series feature amounts 54 from among the plurality of kinds of time-series feature amounts 54 calculated by the first calculation section 42. One or more machine-learned learning units 50 are used to calculate the integrated feature amount 56. The learning unit 50 may include a neural network operator in which a learning parameter group is set in advance. The learning parameter group is an aggregate of learning parameters for specifying the operation rules of the learning unit 50. The learning parameters may include a coefficient used for describing the activation function of an operation unit, a weighting coefficient corresponding to the strength of synapse coupling, the number of operation units configuring each layer, the number of intermediate layers, and other parameters.

The content evaluation section 46 evaluates the handwritten content in reference to the integrated feature amount 56 calculated by the second calculation section 44 and outputs the evaluation result of the handwritten content (that is, "evaluation result information 58"). The method of the evaluation process differs depending on the type of handwritten content.

In evaluating the answer 60 (FIG. 4), examples of evaluation items may include the degree of performance of the answer 60, the degree of comprehension, the degree of effort, and other characteristics. Here, the "degree of performance" may be a continuous value such as a score or a discrete value such as a rank. Examples of the "degree of comprehension" include items the user is good at, items the user is not good at, a preparation pattern of the answer 60, and other characteristics. Examples of the "degree of effort" include the degree of focus in preparing the answer 60, and other characteristics.

In evaluating the artwork 100 (FIG. 11), examples of evaluation items include the style of the artwork 100, the habits of the creator, the psychological state of the creator, the external environment at the time of creation, and other characteristics. Here, the "style" means the personality or thoughts of the user that are manifest in the handwritten content. Examples of the "habits" include the repeated use of colors, the tendency to draw strokes, the tendency of how the drawing tools are used, the degree of operation errors, and other characteristics. Examples of the "psychological state" include drowsiness, relaxation, and tension, in addition to emotions including delight, anger, sorrow, and pleasure. Examples of the "external environment" include the brightness of the surrounding area, the temperature, the weather, and the season.

In addition, the content evaluation section 46 may obtain the degree of similarity between the integrated feature amount 56 (a first integrated feature amount) corresponding to the content to be evaluated and the integrated feature amount 56 (a second integrated feature amount) corresponding to the authentic content and determine the authenticity of the handwritten content in reference to the degree of similarity. Various indices including, for example, norms, correlation coefficients, and other indices are used for the degree of similarity.

The display instruction section 48 gives an instruction to an external device, such as the user device 12 illustrated in FIG. 1, about the display of the evaluation result information 58 to be output by the content evaluation section 46. The modes of the "instruction" include "transmission" in addition to "display control" for display on an output device (not illustrated) provided in the server device 16.

The storage section 34 stores programs and data necessary for the control section 32 to control each constitutional element. The storage section 34 includes a non-transient and computer-readable storage medium. Here, the computer-readable storage medium includes storage devices such as an HDD and an SSD incorporated in a computer system, a portable medium such as a magneto-optical disk, a ROM, a CDROM, and a flash memory, or other storage devices.

In FIG. 2, a database (hereinafter, a content DB 52) related to the handwritten content is constructed in the storage section 34, and the plurality of kinds of time-series feature amounts 54, the integrated feature amount 56, and the evaluation result information 58 are stored in the storage section 34.

The evaluation data D1 includes "content data" that is an aggregate of content elements or written inputs constituting the handwritten content and "related data" including various kinds of information related to the creation of the handwritten content.

The content data includes, for example, ink data (or digital ink) for representing the creation process of the handwritten content. "Ink description languages" for describing the digital ink are, for example, Wacom Ink Layer Language (WILL), Ink Markup Language (InkML), and Ink Serialized Format (ISF). The handwritten content may be written pieces including answers, reports, memos, or other written pieces, or may be artworks including paintings, illustrations, characters, or other artworks.

The related data may include user information including the identification information and attribute of the user, "setting conditions on the device driver side" including the resolution, size, and type of the display unit 24, the detection performance and type of the touch sensor 25, the shape of the pen pressure curve, and other details, "setting conditions on the drawing application side" including the type of handwritten content, color information of the color palette and brush, visual effect settings, and other settings, "operation history of the operator" sequentially stored through execution of the drawing application, "biological data" indicating the biological signal of the user at the time of creation of the handwritten content, "environmental data" indicating the state of the external environment at the time of creation of the handwritten content, and other information.

The time-series feature amount 54 indicates a temporal change in the feature amount related to the creation process of the handwritten content and is stored in association with the handwritten content or the identification information of the user. Specifically, the time-series feature amounts 54 are an aggregate of data pairs indicating a correspondence relation between a plurality of kinds of feature amounts and time. The time may be real time, including date and time, elapsed time from the start of the creation process, or the order (for example, the writing order of the writing operations) in which the content elements were generated or edited.

Regarding the evaluation of the answer 60, examples of the feature amounts used for the evaluation of the "degree of performance" include the position and the color of the stroke, and other details. Examples of the feature amounts used for the evaluation of the "degree of comprehension" include the position and the color of the stroke, the moving speed of the electronic pen 14, the rewrite patterns, and other details. Examples of the feature amounts used for the evaluation of the "degree of effort" include the position and the color of the stroke, the pen pressure, the inclination angle, and the moving speed of the electronic pen 14, the pulse rate, the heart rate, and the grip pressure of the user, and other details.

Regarding the evaluation of the artwork 100, examples of the feature amounts used for the evaluation of the "style" include the position and the color of the stroke, the pen pressure, the inclination angle, and the moving speed of the electronic pen 14, and other details. Examples of the feature amounts used for the evaluation of the "habits" include the method of drafting, the way of color painting, the color selection tendency, the rewrite patterns, the hover position of the electronic pen 14, the type of tool used, and other details. Examples of the feature amounts used for the evaluation of the "psychological state" include the pulse rate or the heart rate, the grip pressure, and other details. Examples of the feature amounts used for the evaluation of the "external environment" include the location, the intensity of external sound, the illuminance, the temperature, the humidity, and other details.

The integrated feature amount 56 is a feature amount related to the creation process of the handwritten content and is calculated using two or more kinds of time-series feature amounts 54. For example, by integrating the time-series feature amounts 54 related to at least two of the positions corresponding to the stroke, the moving speed of the electronic pen 14 corresponding to the stroke, and the pen pressure of the electronic pen 14 corresponding to the stroke, the integrated feature amount 56 for evaluating the degree of motivation or the degree of concentration of the user is obtained. Alternatively, by integrating the time-series feature amounts 54 related to at least two of the positions corresponding to the stroke, the color corresponding to the stroke, and the pen pressure of the electronic pen 14 corresponding to the stroke, the integrated feature amount 56 for evaluating the style or authenticity of the artwork 100 is obtained.

The evaluation result information 58 includes the evaluation result of the handwritten content by the content evaluation section 46. Examples of the evaluation results include the result of a single evaluation including a classification category, a score, a state, and other results, and the result of a comparative evaluation including the degree of similarity, authenticity determination, and other results. In addition, the evaluation result information 58 is information derived from the evaluation results described above, and may include, for example, visible information (hereinafter, referred to as "awareness information") for giving the user content awareness. Examples of awareness information include a different expression (for example, a symbol that indicates the strength of a discerned characteristic, a word with high similarity, and other indicators) of the contents of the evaluation item in an abstract or symbolic manner.

Operation of Content Evaluation System 10

The content evaluation system 10 in this embodiment is configured as described above. Next, an evaluation operation of handwritten content by the content evaluation system 10 will be described with reference to FIG. 3 to FIG. 13.

First Example: Evaluation of Learning Motivation

Figure 3:
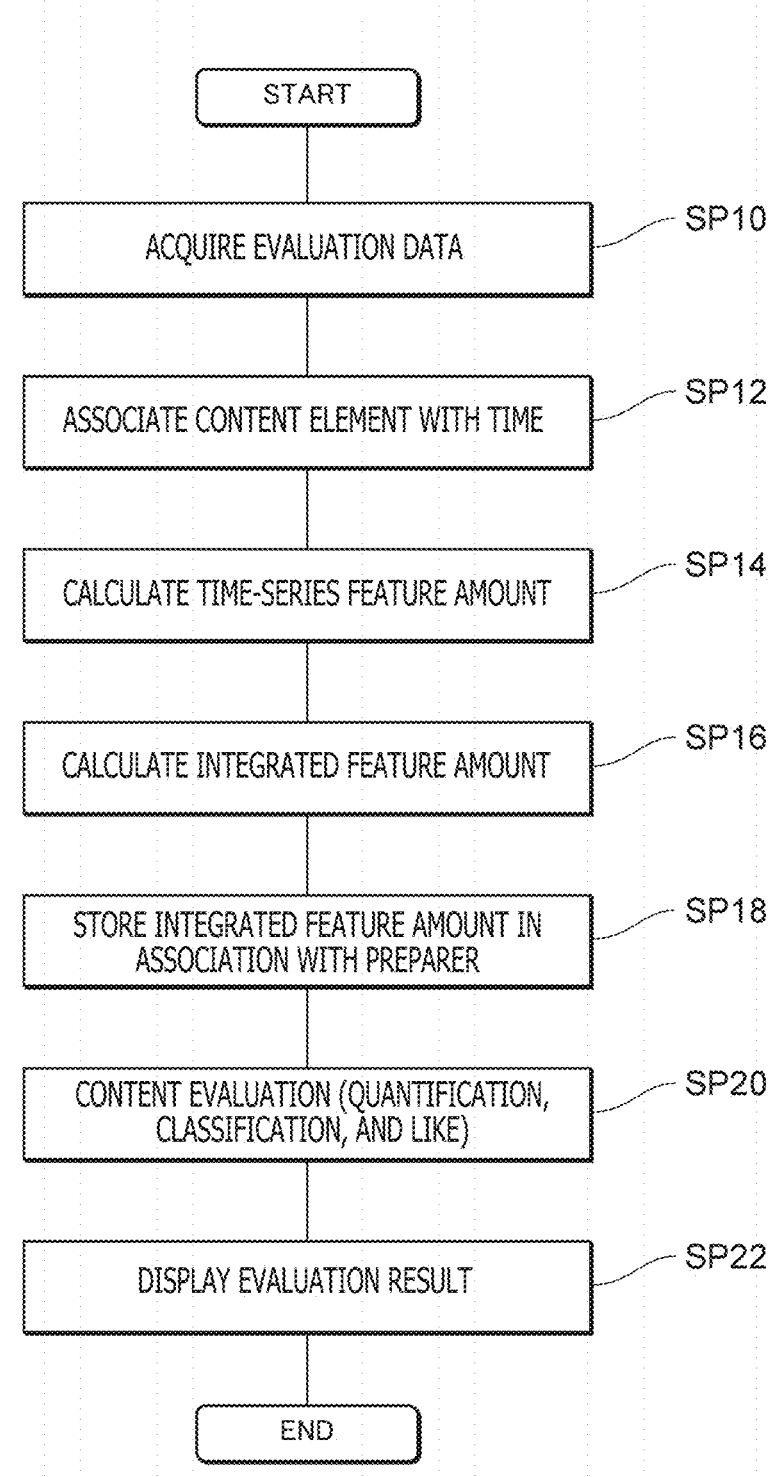
FIG. 3 is a flowchart illustrating a first operation of the content evaluation system depicted in FIG. 1.

FIG. 3 is a flowchart illustrating a first operation of the content evaluation system depicted in FIG. 1. The "first operation" means, for example, an operation for evaluating and presenting the "learning motivation" of a user during the creation process of the handwritten content.

In Step SP10, the data acquisition section 40 of the server device 16 acquires the evaluation data D1 used for the evaluation of the handwritten content. Specifically, this acquisition includes at least the content data, and, if necessary, the related data.

Figure 4:
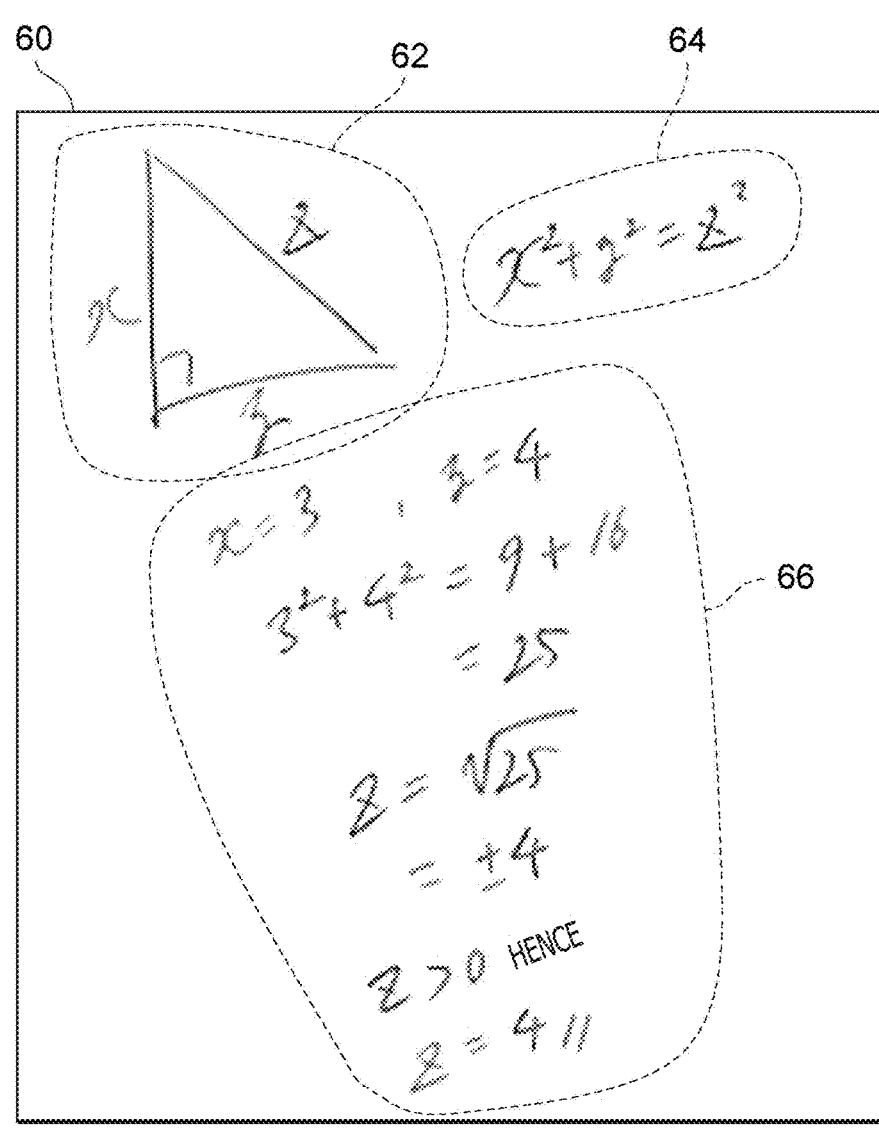
FIG. 4 is a diagram illustrating an example of handwritten content prepared using a user device illustrated in FIG. 1.

FIG. 4 is a diagram illustrating an example of handwritten content prepared using a user device illustrated in FIG. 1. Here, the handwritten content depicts answer 60 to a mathematical problem for obtaining the length of the hypotenuse of a right triangle. The answer 60 includes a content element 62 for indicating a figure, a content element 64 for indicating a formula related to the Pythagorean theorem, and a content element 66 for indicating a calculation process.

FIG. 5 is a diagram illustrating an example of a data structure of content data included in evaluation data. The example of the answer 60 (FIG. 4) depicts a case where the content data is digital ink. The digital ink has a data structure formed by sequentially arranging document metadata (document metadata), semantic data (ink semantics), device data (devices), stroke data (strokes), classification data (groups), and context data (contexts).

Stroke data 68 is data for describing individual strokes that form the handwritten content and that depicts the shape and writing order of the strokes. As will be understood from FIG. 5, one stroke is described by a plurality of pieces of point data sequentially arranged in <trace> tags. Each point data includes at least an instruction position (X-coordinate and Y-coordinate) and is separated by a delimiter such as a comma. For the convenience of illustration, only the pieces of point data indicating the start point and the end point of the stroke are written, and the point data indicating a plurality of via points is omitted. In addition to the instruction position described above, the point data may include the order of generation or editing of the stroke, the pen pressure and the posture of the electronic pen 14, and other details.

In Step SP12, the first calculation section 42 performs the association process for associating the content element with time by using the evaluation data D1 acquired in Step SP10. The content elements include, for example, strokes, figures, text characters, coloring, and other details. For example, in the case where a time stamp is provided for each user operation, the first calculation section 42 associates the content element associated with the user operation with the real time specified by the time stamp. Alternatively, in the case where an index for indicating a writing order for each content element is given, the first calculation section 42 associates the content element with the index.

In Step SP14, the first calculation section 42 calculates the time-series feature amount 54 indicating a temporal change in the feature amount related to the creation process of the handwritten content by using the data set associated in Step SP12. Specifically, the first calculation section 42 calculates a plurality of kinds of time-series feature amounts 54 by aggregating a plurality of kinds of feature amounts at every hour.

Figure 6:
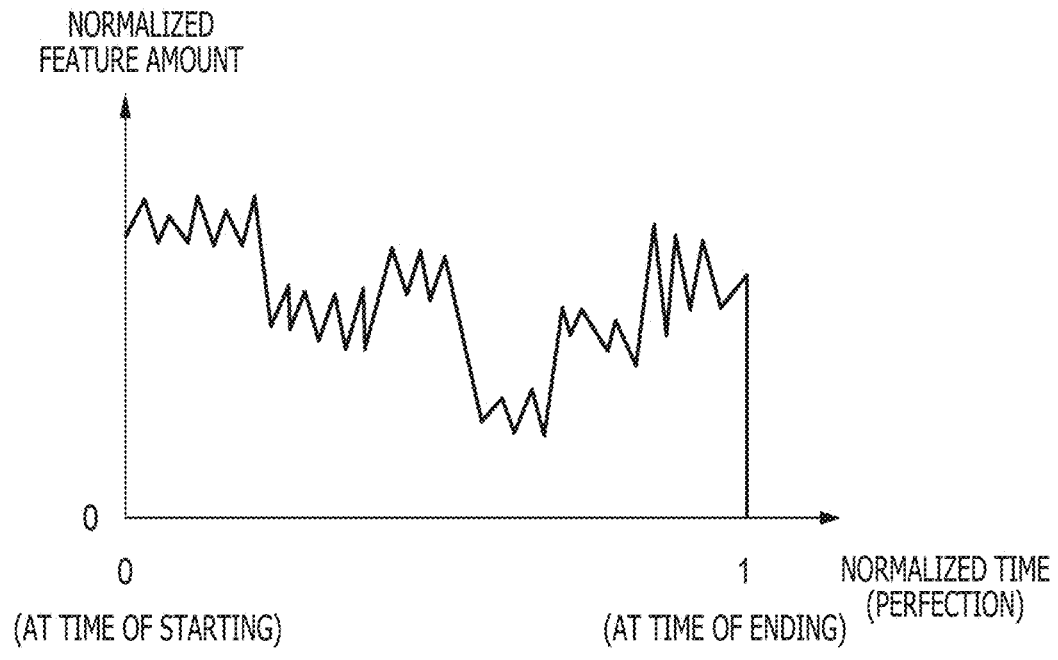
FIG. 6 is a diagram illustrating an example of a time-series feature amount calculated by a first calculation section.

FIG. 6 is a diagram illustrating an example of a time-series feature amount calculated by a first calculation section 42. The horizontal axis of the graph indicates a normalized time (unit: dimensionless), and the vertical axis of the graph indicates a normalized feature amount (unit: dimensionless). Here, the normalized time is the normalized elapsed time from the time point when the creation of the handwritten content starts (that is, the starting time point) to the completion of the handwritten content.

Specifically, the normalized time is defined such that the value corresponding to the starting time point is "0" and the value corresponding to the time point at which the creation of the handwritten content is complete (that is, the ending time point) is "1." As described above, by keeping the length of time (that is, the time range) required for completing the handwritten content constant, the features of the handwritten content can be more accurately captured. Specifically, in the case where the feature amount is an 8-bit color value (0 to 255) of the CIERGB color system, the normalized feature amount is a value normalized to the range of [0, 1] by dividing each of the R value, the G value, and the B value by a maximum value of 255. As described above, by keeping the range of the feature amount related to the content element constant, the features of the content can be more accurately captured.

In Step SP16, the second calculation section 44 calculates a motivation feature amount 56A (a mode of the integrated feature amount 56) for evaluating the learning motivation of the user, in reference to two or more kinds of time-series feature amounts 54 among the plurality of kinds of time-series feature amounts 54 calculated in Step SP14. A learning unit 50A is used to quantify the learning motivation.

Figure 7:
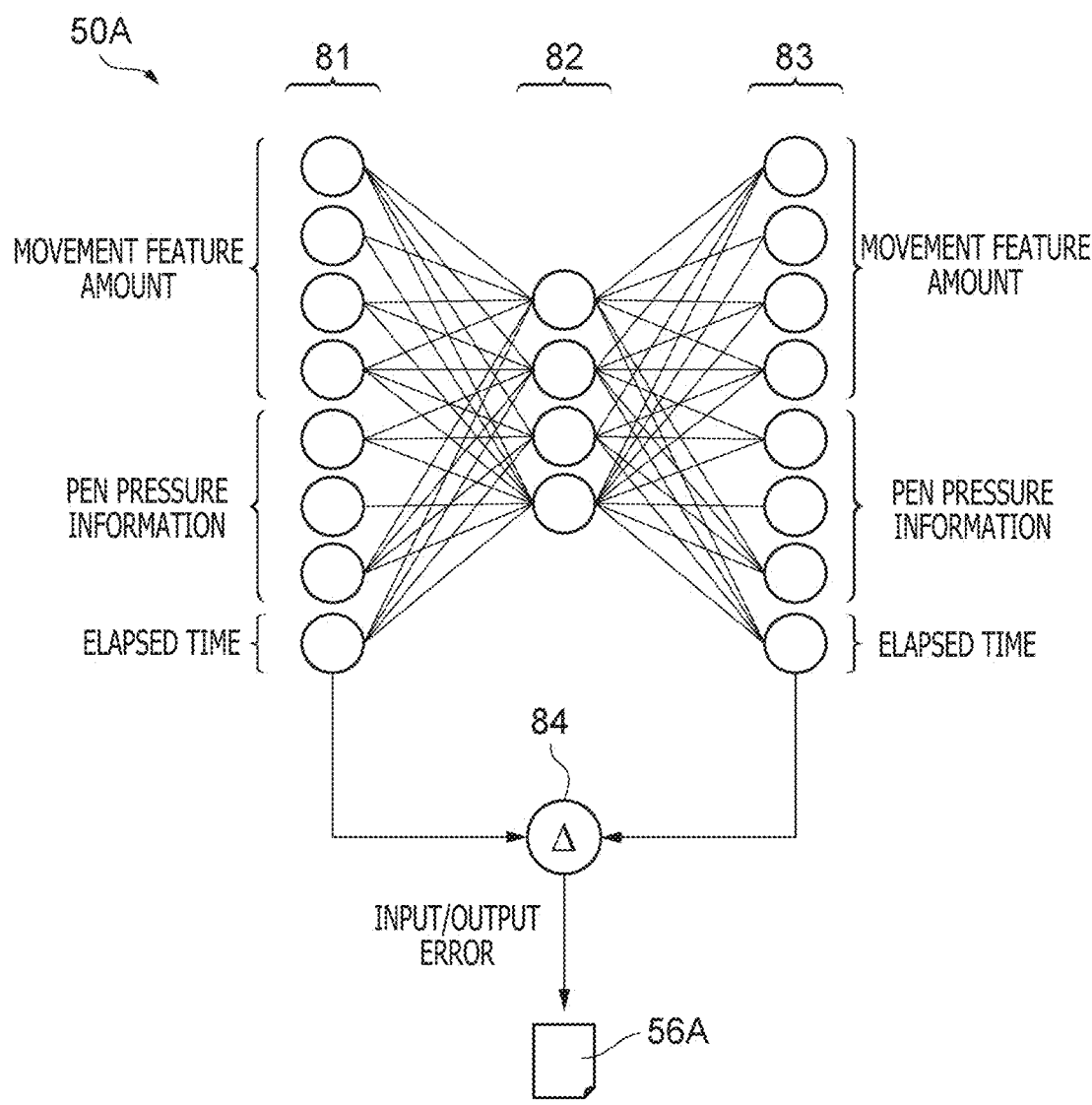
FIG. 7 is a diagram illustrating a first example of a network structure of a learning unit.

FIG. 7 is a diagram illustrating a first example of a network structure of a learning unit 50A. The learning unit 50A is configured with a self-encoder for data abnormality detection. Specifically, the learning unit 50A is a hierarchical neural net operator including an input layer 81, an intermediate layer 82, and an output layer 83. The input layer 81 includes N operation units for inputting each value of the feature amounts. The intermediate layer 82 is configured with M (here, $1 \leq M < N$) operation units. The output layer 83 includes operation units the number of which is the same (that is, N) as that in the configuration of the input layer 81. In the case of this network configuration, the input layer 81 and the intermediate layer 82 assume a "dimension compression function," and the intermediate layer 82 and the output layer 83 assume a "dimension restoration function."

A learning parameter group configuring the learning unit 50A is optimized by what is generally called "unsupervised learning." In the answer 60, the data set used for machine learning includes the movement feature amount of the electronic pen 14, the pressure feature amount of the electronic pen 14, and the normalized time. This data set is, for example, an aggregate of pieces of data collected when a particular user or unspecified large number of users in a high learning motivation state prepare the answer 60.

Incidentally, a subtractor 84 connected to the input layer 81 and the output layer 83 is provided outside the learning unit 50A. The subtractor 84 calculates an error (hereinafter, also referred to as an "input/output error") between an input feature amount set and an output feature amount set. The input/output error may be, for example, either an L1 error or an L2 error. Through this series of operations, the motivation feature amount 56A for indicating the degree of decline in learning motivation is calculated.

In Step SP18, the second calculation section 44 supplies the motivation feature amount 56A calculated in Step SP16 to the storage section 34 (FIG. 2) together with the user information from the handwritten content, such as the answer 60. Accordingly, the motivation feature amount 56A is stored in the content DB 52 in a state associated with the user.

In Step SP20, the content evaluation section 46 performs, if necessary, a desired evaluation process for the motivation feature amount 56A stored in Step SP18, and outputs the evaluation result information 58 including the evaluation result of the handwritten content. In the example of the first operation, the content evaluation section 46 evaluates the learning motivation of the user by a determination process for the motivation feature amount 56A.

Figure 8:
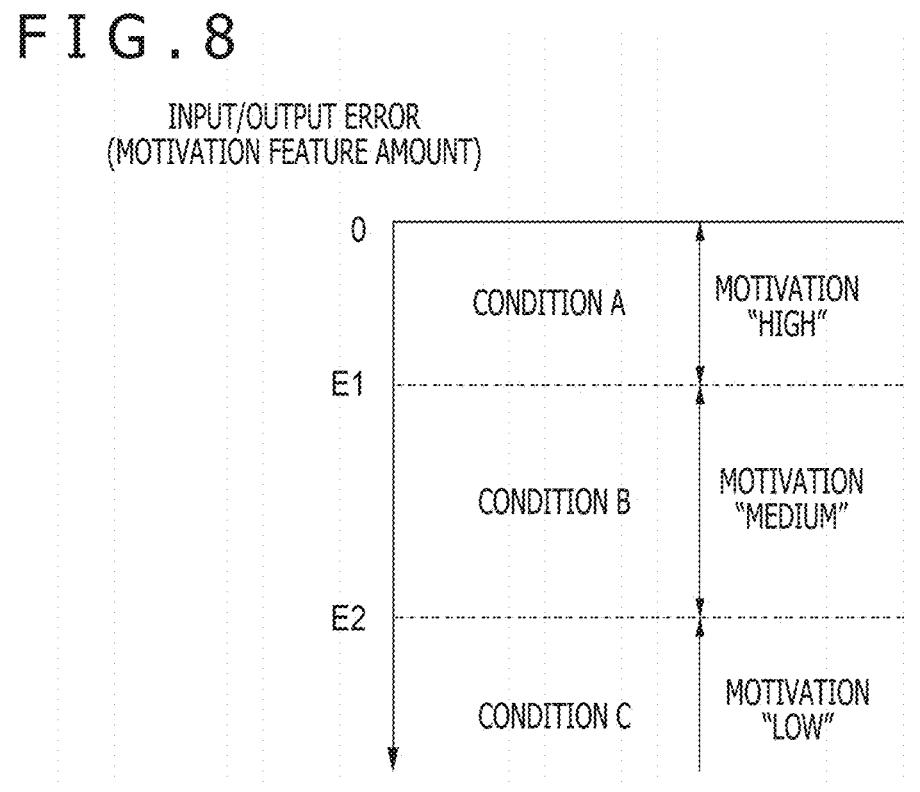

FIG. 8 is a diagram illustrating an example of a method for determining learning motivation. The axis of the graph indicates the magnitude of the input/output error indicated by the motivation feature amount 56A. In the case where the input/output error is equal to or more than 0 but less than E1, the content evaluation section 46 determines that the learning motivation of the student is "high." In the case where the input/output error is equal to or more than E1 but less than E2, the content evaluation section 46 determines that the learning motivation of the student is "medium." In the case where the input/output error is equal to or more than E2, the content evaluation section 46 determines that the learning motivation of the student is "low."

In Step SP22, the display instruction section 48 gives an instruction to an external device, such as user device 12, in the form of communication data about the display of the evaluation result information 58 obtained in Step SP20. Accordingly, the student can visually recognize the evaluation result of the answer 60 during or after creation of the handwritten content, via the display unit 24 (FIG. 1) of the user device 12.

Figure 9:
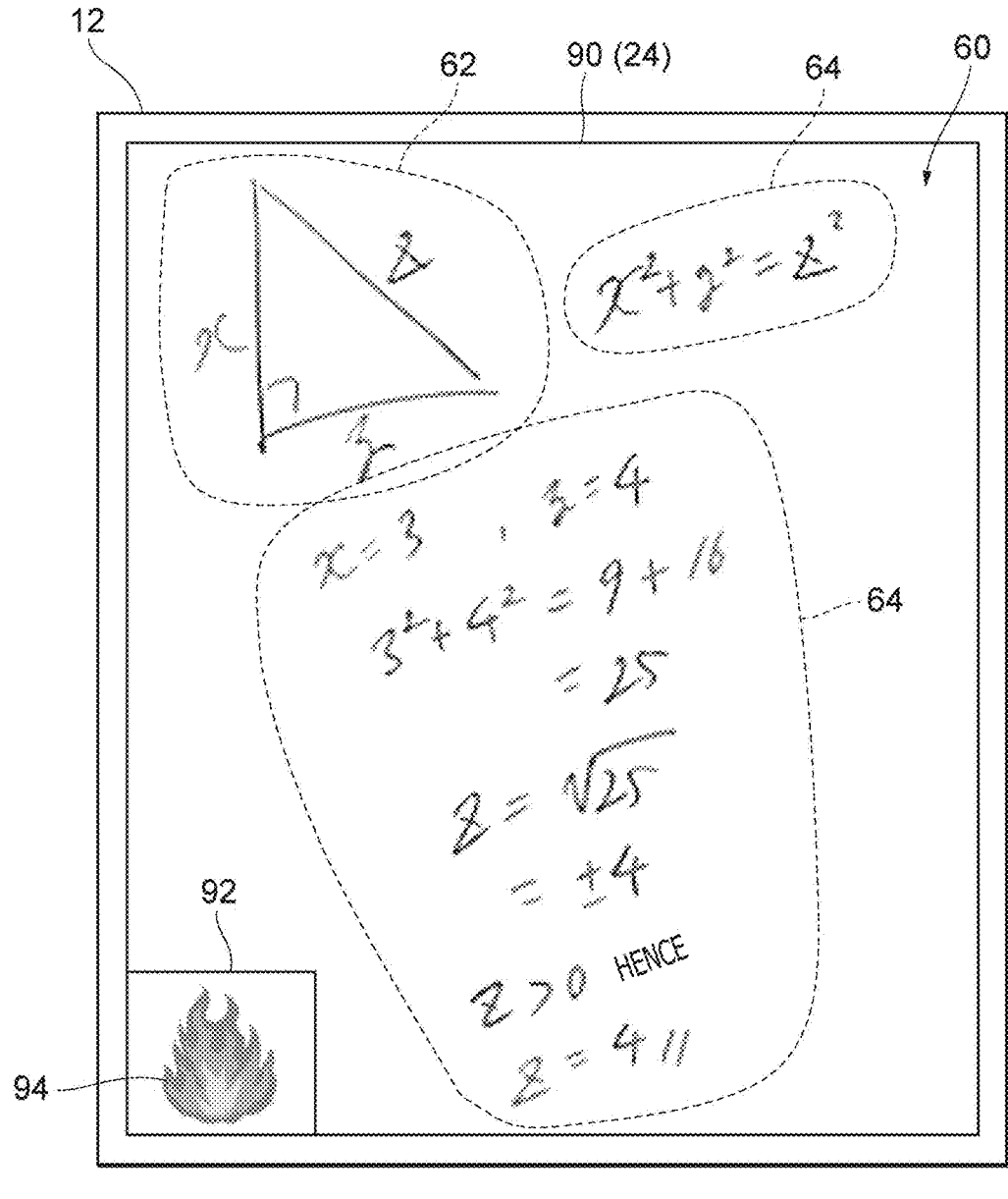
FIG. 9 is a diagram illustrating an example of evaluation result information displayed together with handwritten content.

FIG. 9 is a diagram illustrating an example of evaluation result information 58 together with handwritten content. The display unit 24 of the user device 12 is provided with a display area 90 for displaying the handwritten content. An information presentation column 92 for displaying the evaluation result information 58 is provided in the lower left corner of the display area 90. In the information presentation column 92, a symbol 94 of a flame, a mode of the evaluation result information 58, is arranged.

Figure 10:
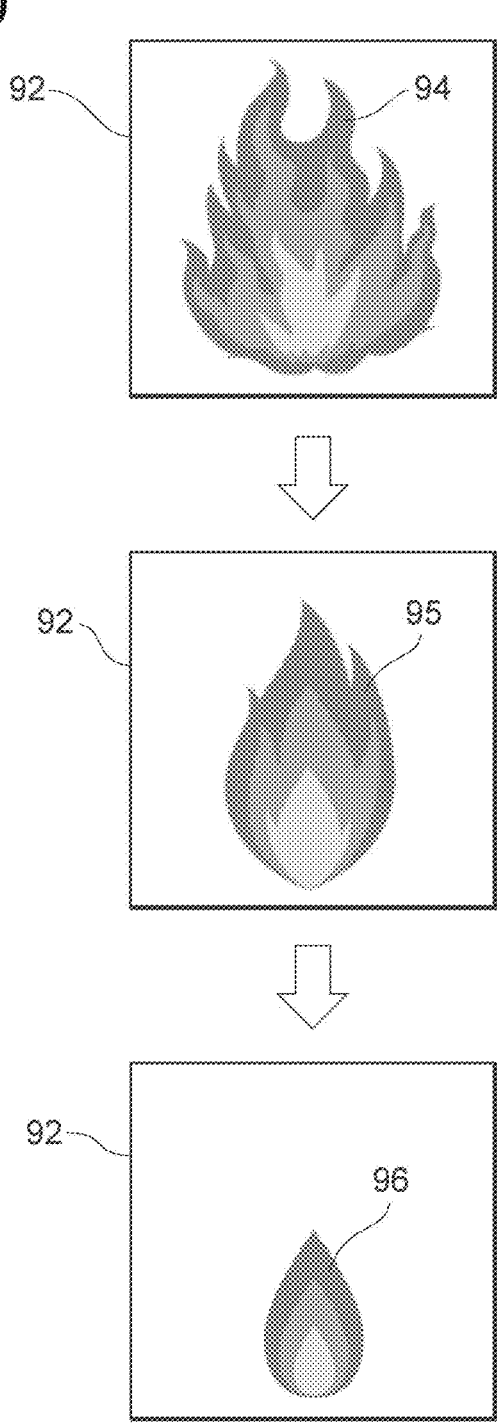
FIG. 10 is a diagram illustrating a state change in symbols according to learning motivation of a user.

FIG. 10 is a diagram illustrating a state change in symbols 94-96 according to the learning motivation of a user. The symbols 94, 95, and 96 are arranged in the information presentation column and have different forms depending on the degree of learning motivation. For example, in a state where the learning motivation is "high," the symbol 94 for indicating a flame of high heat is selected. In addition, in a state where the learning motivation is "medium," the symbol 95 for indicating a flame of medium heat is selected. Further, in a state where the learning motivation is "low," the symbol 96 for indicating a flame of low heat is selected. As described above, the user device 12 displays the symbols 94 to 96, which are each a mode of the evaluation result information 58, together with the answer 60, which is a mode of the handwritten content, so that the user can be made aware of their learning motivation.

In this manner, the content evaluation system 10 finishes the first operation depicted in the flowchart of FIG. 3. For example, by starting the execution of the flowchart when the answer 60 is finished, the content evaluation system 10 can perform an evaluation throughout the creation process of the answer 60. Alternatively, by starting the execution of the flowchart during the creation of the answer 60, the content evaluation system 10 can perform an evaluation in real time.

Second Operation: Style Evaluation of Artwork

Next, a second operation of the content evaluation system 10 will be described with reference to FIG. 11 to FIG. 13. The "second operation" means, for example, an operation for evaluating and presenting the "style" of the handwritten content, such as an artwork 100. The content evaluation system 10 performs the second operation according to the flowchart depicted in FIG. 3 as in the case of the first operation. Hereinafter, the operations in Steps SP16, SP18, and SP20 of FIG. 3 will be described in detail.

Figure 11:
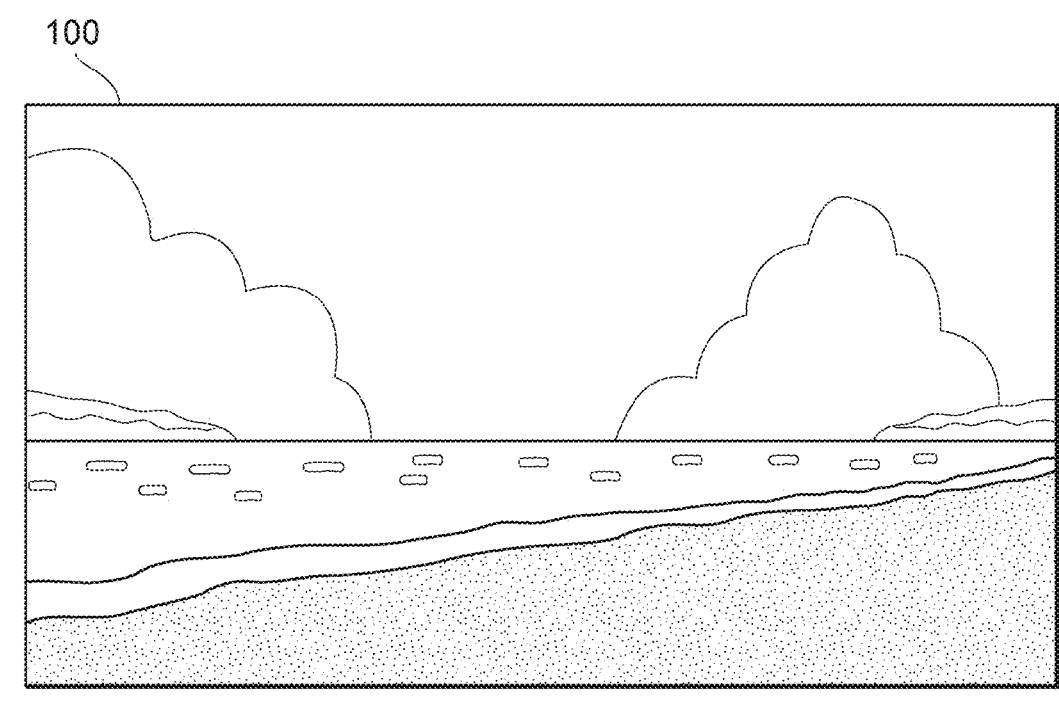
FIG. 11 is a diagram illustrating a second example of content prepared using the user device illustrated in FIG. 1.

FIG. 11. is a diagram illustrating a second example of content prepared using the user device 12 illustrated in FIG. 1. Here, the handwritten content is the artwork 100 in which a scene of a sandy beach is drawn. The user completes the desired artwork 100 through the user device 12 and the electronic pen 14. Even in the case where a plurality of creators draws a similar scene, the creation process including the drawing process and the use of color differs depends on each creator.

In Step SP16, the second calculation section 44 calculates a style feature amount 56B (a mode of the integrated feature amount 56) in reference to two or more kinds of time-series feature amounts 54 among the plurality of kinds of time-series feature amounts 54 calculated in Step SP14. A learning unit 50B is used to quantify the style.

FIG. 12 is a diagram illustrating a second example of a network structure of the learning unit 50B. The learning unit 50B includes a self-encoder for data feature extraction. Specifically, the learning unit 50B is a hierarchical neural net operator including an input layer 111, an intermediate layer 112, and an output layer 113. The input layer 111 includes with N operation units for inputting each value of the feature amounts. The intermediate layer 112 includes M (here, $1 \le M < N$) operation units. The output layer 113 includes operation units the number of which is the same (that is, N) as that in the configuration of the input layer 111. In the case of this network configuration, the input layer 111 and the intermediate layer 112 assume a "dimension compression function," and the intermediate layer 112 and the output layer 113 assume a "dimension restoration function."

A learning parameter group configuring the learning unit 50B is optimized by what is generally called "unsupervised learning." In the example of the artwork 100, the data set used for machine learning includes the color and position feature amount related to the color and position of the stroke, the pen pressure feature amount of the electronic pen 14, and the completion of the artwork 100. The data set is, for example, an aggregate of pieces of data collected when the creator to be evaluated prepared a plurality of artworks 100 in the past.

The learning unit 50B inputs a feature amount set (N-dimensional vector) for each stroke to the input layer 111 and outputs a compression feature amount (M-dimensional vector) from the intermediate layer 112, so that a drawing feature amount for each stroke is generated. Then, the second calculation section 44 calculates a representative value (for example, statistics including the average value, the maximum value, the minimum value, and the most frequent value) for each vector component for the population of the drawing feature amounts. Through this series of operations, the style feature amount 56B indicating the style of the handwritten content is calculated.

In Step SP20, the content evaluation section 46 performs, if necessary, a desired evaluation process for the style feature amount 56B stored in Step SP18, and outputs the evaluation result information 58 including the evaluation result of the handwritten content. In the example of the second operation, the content evaluation section 46 evaluates the style of the corresponding artwork 100 by a classification process for the style feature amount 56B.

Figure 13:
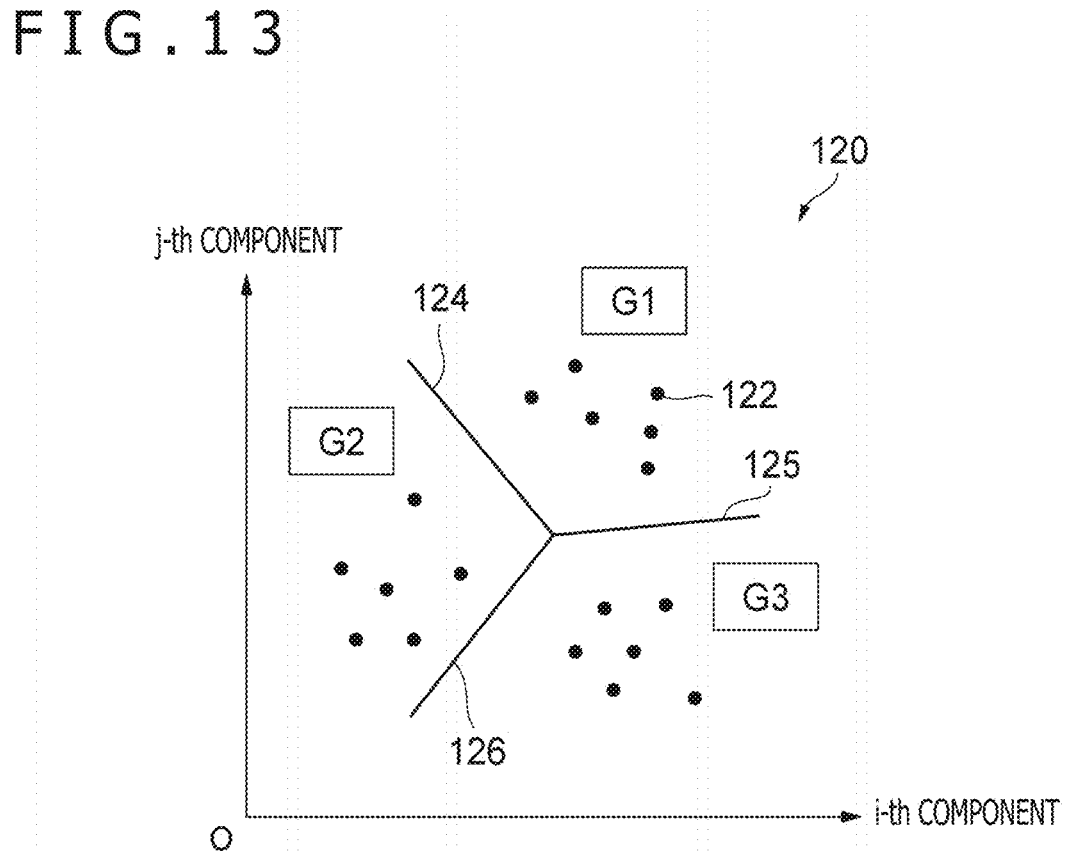
FIG. 13 is a diagram illustrating an example of a method for classifying styles.

FIG. 13 is a diagram illustrating an example of a method for classifying styles. Here, an M-dimensional feature amount coordinate space 120 in which each axis represents an M-dimensional vector component that is the style feature amount 56B is depicted. For the sake of illustration, only two components (i-th, j-th) among M vector components are written. An aggregate of feature points 122 associated with various artworks 100 is provided on the feature amount coordinate space 120.

The aggregate of the feature points 122 forms a plurality (three in the example of the drawing) of clusters. A group G1 including a first style is partitioned by two boundary lines 124 and 125. A group G2 including a second style is partitioned by two boundary lines 124 and 126. A group G3 including a third style is partitioned by two boundary lines 125 and 126. Here, The relation between the position indicated by the style feature amount 56B and the three boundary lines 124 to 126 determines to which of the groups G1 to G3 the style belongs.

As described above, the user device 12 displays the evaluation result information 58 together with the artwork 100, which is a mode of the handwritten content, so that the user can be made aware of their style as in the case of the first operation. As described above, the content evaluation system 10 finishes the second operation depicted in the flowchart of FIG. 3.

Summary of Embodiment

As described above, the content evaluation system 10 in the embodiment includes the electronic pen 14, and the data generation section (here, the processor 21) that takes the writing operations performed by the user through the electronic pen 14 and generates content data corresponding to the handwritten content (for example, the answer 60 or the artwork 100) The data acquisition section 40 acquires the content data generated by the processor 21. The first calculation section 42 calculates the plurality of kinds of time-series feature amounts 54 indicating a temporal change in a plurality of kinds of feature amounts related to the creation process of the handwritten content from the acquired content data, and the second calculation section 44 then calculates the integrated feature amount 56 related to the creation process of the handwritten content by using two or more kinds of time-series feature amounts 54 from among the plurality of kinds of calculated time-series feature amounts 54. The content evaluation section 46 evaluates the handwritten content in reference to the calculated integrated feature amount 56 and outputs the evaluation result information 58 indicating the evaluation result of the handwritten content.

In addition, according to the content evaluation method or the content evaluation program in an embodiment, one or more computers (processors) can execute the acquisition step (SP10) of acquiring the content data indicating the handwritten content, the first calculation step (SP14) of calculating the plurality of kinds of time-series feature amounts 54 indicating a temporal change in a plurality of kinds of feature amounts related to the creation process of the handwritten content from the acquired content data, the second calculation step (SP16) of calculating the integrated feature amount 56 related to the creation process of the handwritten content by using two or more kinds of time-series feature amounts 54 from among the plurality of kinds of calculated time-series feature amounts 54, and lastly the evaluation step (SP20) of evaluating the handwritten content in reference to the calculated integrated feature amount 56 and outputting the evaluation result information 58 indicating the evaluation result of the handwritten content. In addition, the recording medium in the embodiment is a computer-readable non-transient recording medium and stores the above-described program.

As described above, the integrated feature amount 56 related to the creation process of the handwritten content is calculated by use of two or more kinds of time-series feature amounts 54 indicating a temporal change in the feature amount. The handwritten content is evaluated in reference to the integrated feature amount 56, so that the handwritten content can be evaluated more precisely when it is simply evaluated through the finished product.

For example, in the case where the handwritten content is the answer 60 (FIG. 4) to a given problem, the content data may include the stroke data 68 indicating an aggregate of strokes, or two or more kinds of time-series feature amounts 54 which may include the first time-series feature amount indicating a temporal change in the position of the electronic pen 14 corresponding to the stroke and the second time-series feature amount indicating a temporal change in the moving speed of the electronic pen 14 corresponding to the stroke. Alternatively, there may be two or more kinds of time-series feature amounts 54 which include the first time-series feature amount indicating a temporal change in the moving speed of the electronic pen 14 corresponding to the stroke and the second time-series feature amount indicating a temporal change in the pen pressure of the electronic pen 14 corresponding to the stroke. Additionally, the evaluation result information 58 may include the degree of motivation or the degree of concentration of the user.

Additionally, in the case where the handwritten content is the artwork 100 (FIG. 11), the content data may include the stroke data 68 indicating an aggregate of strokes, two or more kinds of time-series feature amounts 54 which may include the first time-series feature amount indicating a temporal change in the position of the electronic pen 14 corresponding to the stroke and the second time-series feature amount indicating a temporal change in the pen pressure of the electronic pen 14 corresponding to the stroke. Alternatively, the two or more kinds of time-series feature amounts 54 may include the first time-series feature amount indicating a temporal change in the position of the electronic pen 14 corresponding to the stroke and the second time-series feature amount indicating a temporal change in the color corresponding to the stroke. The evaluation result information 58 may include the style or authenticity of the artwork 100.

In addition, the content evaluation system 10 may further include a display section (here, the display unit 24) for displaying the evaluation result information 58 output from the content evaluation section 46 together with the handwritten content. Accordingly, the user who has visually recognized the evaluation result information 58 can become aware of the discerned characteristic related to the creation process of the handwritten content.

In addition, the processor 21 and the display unit 24 may be included in the user device 12. The data acquisition section 40, the first calculation section 42, the second calculation section 44, and the content evaluation section 46 may be included in the server device 16 configured to be capable of communicating with the user device 12. Further, each time the user device 12 accepts a writing operation using the electronic pen 14, the user device 12 may sequentially transmit the content data generated by the processor 21, receive the evaluation result information 58 from the server device 16, and display the evaluation result information 58 by the display unit 24. Accordingly, the evaluation result can be provided in real time during the creation of the handwritten content, and the user can reflect on the evaluation result in the subsequent handwritten content.

In addition, the second calculation section 44 may calculate the integrated feature amount 56 by using a neural network operator (here, the learning unit 50) that receives input of the time-series feature amount 54. Accordingly, it is possible to obtain the integrated feature amount 56 in which complex relations among a plurality of kinds of feature amounts are reflected.

Modified Example

The present disclosure is not intended to be exhaustive or to limit the disclosure to the above-described embodiment, and many modifications are possible in view of the present disclosure. Alternatively, the respective configurations may be optionally combined with each other to the extent that no technical inconsistency occurs. As well, the execution order of the respective steps configuring the flowchart may be changed to the extent that no technical inconsistency occurs.

Although an example of calculating the integrated feature amount 56 by using the self-encoder (FIG. 7 and FIG. 12) has been described in the above embodiment, the network structure of the learning unit 50 is not limited thereto. For example, the learning unit 50 may input an aggregate of a plurality of kinds of time-series feature amounts 54, and may be configured with a "regression-type" neural network operator that outputs a quantitative value indicating the degree of motivation or the degree of concentration of the user, or a "classification-type" neural network operator that outputs a label value indicating the classification of the style.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A content evaluation system configured to evaluate a creation process of handwritten content, the content evaluation system comprising:

an electronic pen;

a data generation section that generates content data indicating handwritten content by accepting a writing operation using the electronic pen;

a data acquisition section that acquires the content data generated by the data generation section;

a first calculation section that calculates, from the content data acquired by the data acquisition section, a plurality of kinds of time-series feature amounts indicating temporal changes in a plurality of kinds of feature amounts related to the creation process of the handwritten content, including at least a first time-series feature amount indicating a temporal change in a pen position feature amount, a second time-series feature amount indicating a temporal change in a pen pressure feature amount, and a third time-series feature amount indicating a temporal change in a pen inclination angle;

a second calculation section that calculates an integrated feature amount related to the creation process of the handwritten content by using at least the first, second and third time-series feature amounts from among the plurality of kinds of time-series feature amounts calculated by the first calculation section;

a content evaluation section that evaluates the creation process of the handwritten content in reference to the integrated feature amount calculated by the second calculation section and outputs evaluation result information indicating an evaluation result of the creation process of the handwritten content, wherein the evaluation result information includes a degree of motivation of a user during the creation process; and a display section that displays the evaluation result information including the degree of motivation;

wherein the content evaluation section continuously evaluates the creation process in real time to update the evaluation result information including the degree of motivation, and the display section displays the degree of motivation as updated in real time during the creation process, and wherein the integrated feature amount is calculated using a neural network operator trained on data sets representing high-motivation states during handwritten content creation.

2. The content evaluation system according to claim 1, wherein the handwritten content is an answer to a given problem.

3. The content evaluation system according to claim 2, wherein the content data includes stroke data indicating an aggregate of strokes, the first time-series feature amount indicates a temporal change in a position of the electronic pen corresponding to a stroke, and the two or more kinds of time-series feature amounts include a fourth time-series feature amount indicating a temporal change in a moving speed of the electronic pen corresponding to the stroke, and the evaluation result information includes the degree of motivation or a degree of concentration of a user.

4. The content evaluation system according to claim 2, wherein the content data includes stroke data indicating an aggregate of strokes, the two or more kinds of time-series feature amounts include a fourth time-series feature amount indicating a temporal change in a moving speed of the electronic pen corresponding to a stroke, and the second time-series feature amount indicates a temporal change in a pen pressure of the electronic pen corresponding to the stroke, and the evaluation result information includes the degree of motivation or a degree of concentration of a user.

5. The content evaluation system according to claim 1, wherein the handwritten content is an artwork.

6. The content evaluation system according to claim 5, wherein the content data includes stroke data indicating an aggregate of strokes, the first time-series feature amount indicates a temporal change in a position corresponding to a stroke and the second time-series feature amount indicates a temporal change in a pen pressure of the electronic pen corresponding to the stroke, and the evaluation result information includes a style or an authenticity of the artwork.

7. The content evaluation system according to claim 5, wherein the content data includes stroke data indicating an aggregate of strokes, the first time-series feature amount indicates a temporal change in a position corresponding to a stroke, and the two or more kinds of time-series feature amounts include a fifth time-series feature amount indicating a temporal change in color corresponding to the stroke, and the evaluation result information includes a style or an authenticity of the artwork.

8. The content evaluation system according to claim 1, wherein the display section displays the evaluation result information from the content evaluation section together with the handwritten content.

9. The content evaluation system according to claim 8, wherein the data generation section and the display section are provided in a user device, the data acquisition section, the first calculation section, the second calculation section, and the content evaluation section are provided in a server device configured to communicate with the user device, and the user device sequentially transmits the content data generated by the data generation section, receives the evaluation result information from the server device, and displays the evaluation result information by the display section each time the user device accepts the writing operation using the electronic pen.

10. A content evaluation method configured to evaluate a creation process of handwritten content, the content evaluation method comprising:

acquiring content data indicating handwritten content in an acquisition step;

calculating, from the acquired content data, a plurality of kinds of time-series feature amounts indicating temporal changes in a plurality of kinds of feature amounts related to the creation process of the handwritten content in a first calculation step, including at least a first time-series feature amount indicating a temporal change in a pen position feature amount, a second time-series feature amount indicating a temporal change in a pen pressure feature amount, and a third time-series feature amount indicating a temporal change in a pen inclination angle;

calculating an integrated feature amount related to the creation process of the handwritten content by using at least the first, second and third time-series feature amounts from among the plurality of kinds of calculated time-series feature amounts in a second calculation step;

evaluating the creation process of the handwritten content in reference to the calculated integrated feature amount and outputting evaluation result information indicating the evaluation result of the creation process of the handwritten content in an evaluation step, wherein the evaluation result information includes a degree of motivation of a user during the creation process;

displaying the evaluation result information including the degree of motivation; and continuously evaluating the creation process in real time to update the evaluation result information including the degree of motivation, and displaying the degree of motivation as updated in real time during the creation process, wherein the integrated feature amount is calculated using a neural network operator trained on data sets representing high-motivation states during handwritten content creation.

11. A non-transitory computer readable medium including a content evaluation program to evaluate a creation process of handwritten content for one or more computers, the program, when executed, performs steps comprising:

an acquisition step of acquiring content data indicating handwritten content;

a first calculation step of calculating, from the acquired content data, a plurality of kinds of time-series feature amounts indicating temporal changes in a plurality of kinds of feature amounts related to the creation process of the handwritten content, including at least a first time-series feature amount indicating a temporal change in a pen position feature amount, a second time-series feature amount indicating a temporal change in a pen pressure feature amount, and a third time-series feature amount indicating a temporal change in a pen inclination angle;

a second calculation step of calculating an integrated feature amount related to the creation process of the handwritten content by using at last the first, second, and third time-series feature amounts from among the plurality of kinds of calculated time-series feature amounts;

an evaluation step of evaluating the creation process of the handwritten content in reference to the calculated integrated feature amount and outputting evaluation result information indicating the evaluation result of the creation process of the handwritten content, wherein the evaluation result information includes a degree of motivation of a user during the creation process;

a display step of displaying the evaluation result information including the degree of motivation; and an update step of continuously evaluating the creation process in real time to update the evaluation result information including the degree of motivation, and displaying the degree of motivation as updated in real time during the creation process, wherein the integrated feature amount is calculated using a neural network operator trained on data sets representing high-motivation states during handwritten content creation.

* * * * *